United States Patent Office 2,705,892
Patented Apr. 12, 1955

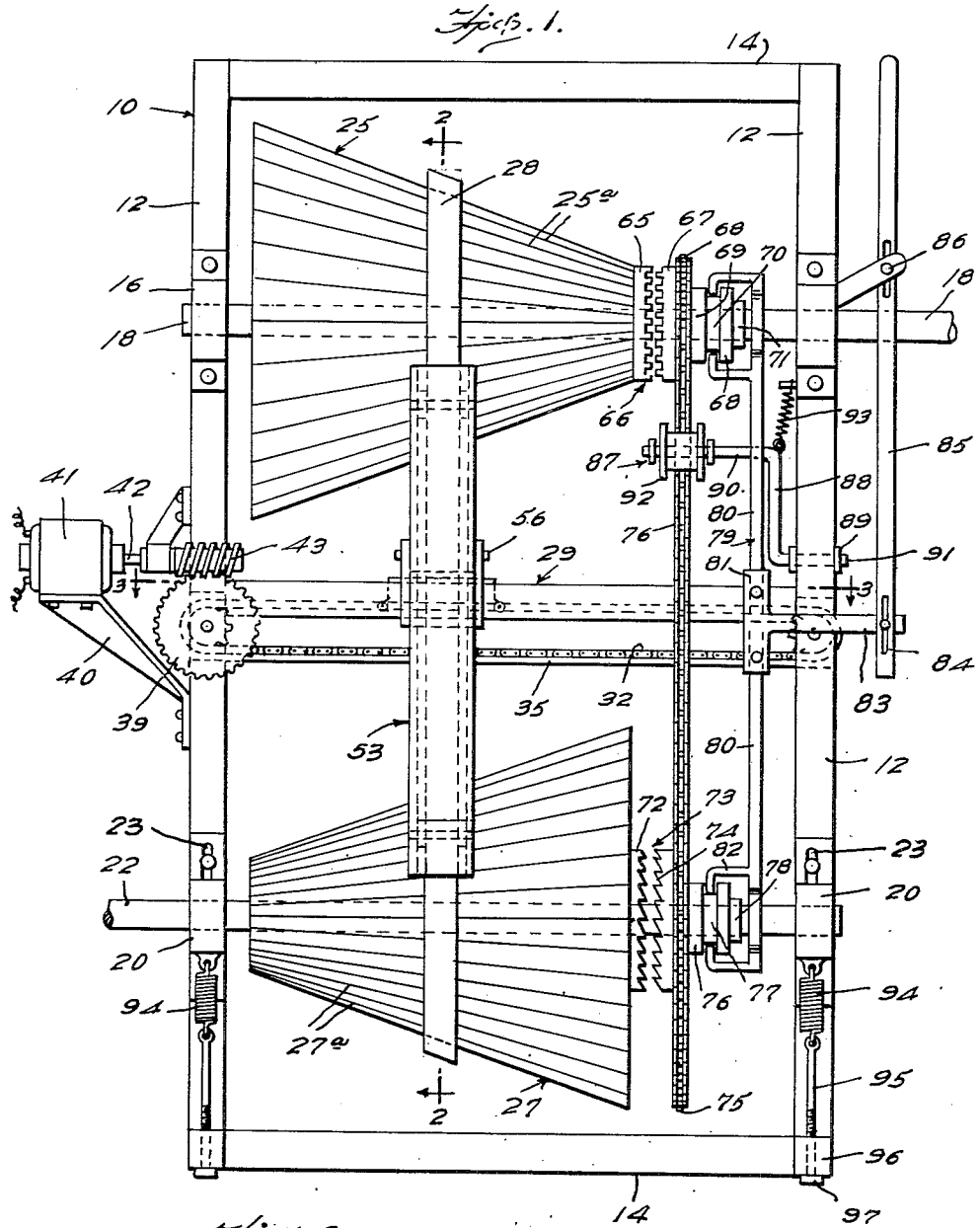

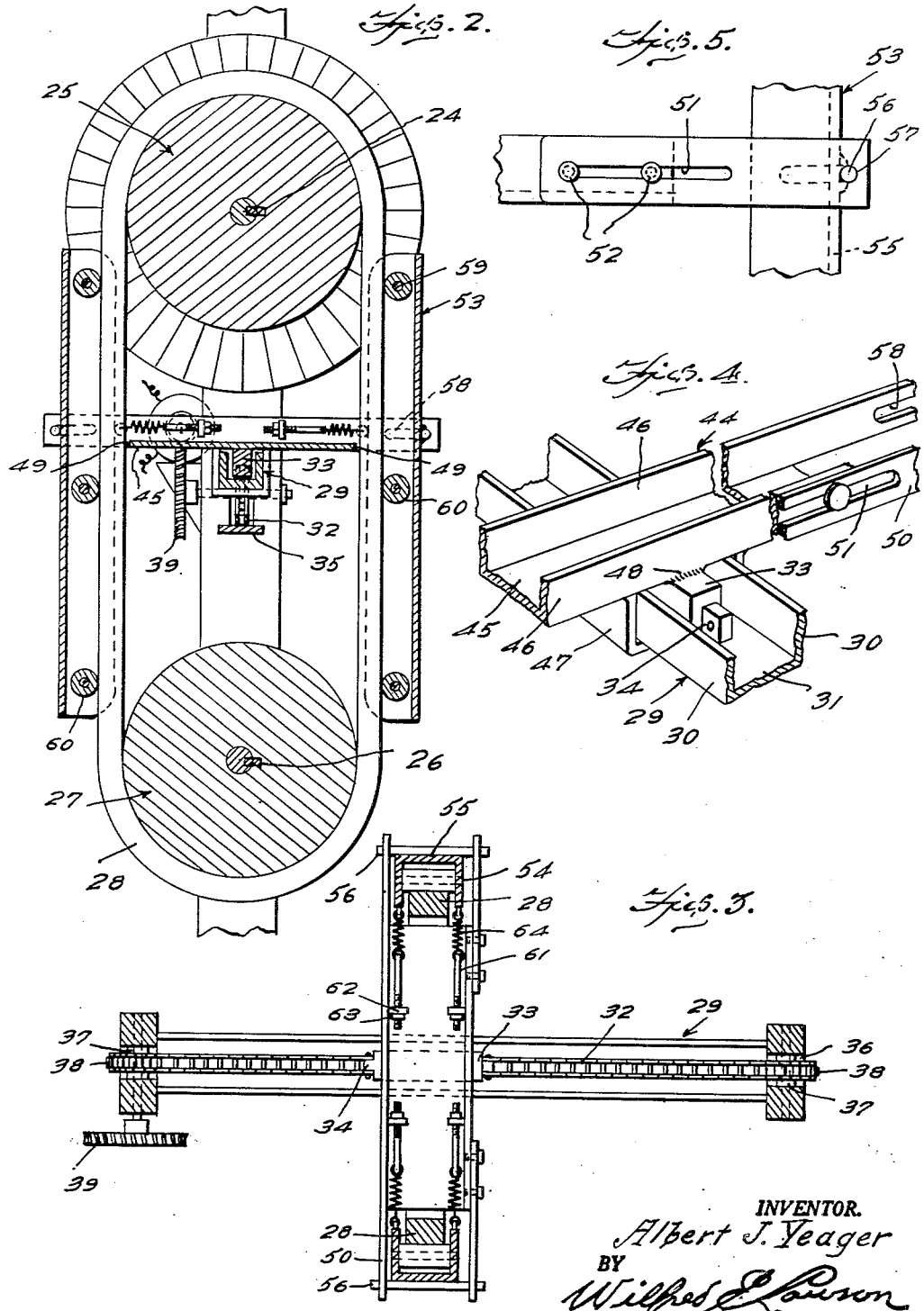

2,705,892

VARIABLE SPEED TRANSMISSION

Albert J. Yeager, Longmont, Colo.

Application September 18, 1951, Serial No. 247,117

3 Claims. (Cl. 74—242.3)

This invention relates generally to power transmission mechanism and is directed particularly to an improved constant mesh variable speed transmission.

A particular object of the present invention is to provide a transmission mechanism wherein the drive and driven elements are constantly operatively coupled together and have means forming the coupling which is shiftable to vary or change the speed ratio between the driving and driven parts.

Another object of the invention is to provide a transmission mechanism of the above described character, wherein means is provided for establishing a direct drive coupling between the drive and driven elements which becomes automatically uncoupled when the driven element speed becomes greater than the speed of the drive element.

A further and more specific object of the invention is to provide a transmission mechanism of the above described character wherein the drive and driven elements comprise juxtaposed oppositely directed cones connected together by a belt, with means for shifting the belt in the direction of the axes of the cones for changing the speed ratio between the cones.

A still further object is to provide in a cone drive mechanism of the character stated, a shiftable sprocket gear and chain connection between supporting shafts for the cones and freely rotatable around the shafts, with means for coupling the chain with the adjacent ends of the cones when the chain is shifted whereby direct drive between the cones is established for starting the transmission under load.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a view in plan of a transmission mechanism constructed in accordance with the preferred embodiment of the present invention.

Figure 2 is a sectional view taken substantially on the line 2—2 of Figure 1.

Figure 3 is a sectional view taken substantially on the line 3—3 of Figure 1.

Figure 4 is a detail perspective view of the connection between the crossed chain guide channel and belt shifting beam.

Figure 5 is a view in side elevation on an enlarged scale of the sliding coupling between the outer ends of the belt shifting beam and the belt guide channels.

Figure 6 is a sectional view taken substantially on the line 6—6 of Figure 1.

Referring more particularly to the drawings the numeral 10 generally designates a supporting frame for the transmission mechanism which is shown as comprising two longitudinal spaced parallel beams 12 and cross connecting beams 14 at the ends.

It is to be understood that while in Figure 1 the mechanism has been shown mounted on an open frame, it is contemplated that all of the illustrated structure may be enclosed within a suitable housing if desired.

Supported on the side beams 12 of the frame are the oppositely positioned bearings 16 through which extend a shaft 18 which constitutes the drive shaft of the mechanism.

Spaced from the bearings 16 are similar bearings 20 which are attached in any suitable manner, to the beams 12, as indicated at 23, for limited adjustment thereon relative to the bearings 16.

The bearings 20, which are oppositely disposed on the frame, have connected therebetween and support a shaft 22 which comprises the driven shaft of the mechanism.

On the drive shaft 18 there is supported and secured by a suitable key 24, or in any other suitable manner, a cone pulley 25 and upon the driven shaft 22 there is supported and secured to the shaft by means of a key 26, or in any other suitable manner, a driven cone pulley 27. As shown, the pulleys are oppositely disposed so that their adjacent faces are parallel, the mechanism here being shown as having the smaller end of the drive pulley 25 directed to the right and the smaller end of the driven pulley 27 directed to the left, although this arrangement does not necessarily have to be followed.

The cones are also shown as being of the same length and of the same diameters at the bases and at the smaller ends. However, under certain conditions the cones could be cut off in the same plane at the right hand end whereby the right end of the drive cone would be somewhat larger than the left end of the driven cone and provision thus made to provide a high ratio of speed to the driven cone by the hereinafter described coupling mechanism. On the other hand for a low ratio of power without the high speed ratio the cones could be cut off on the left hand ends, in a common plane, with the right hand ends left as illustrated whereby the smaller end of the driven cone would be of larger diameter than the smaller end of the drive cone.

The surfaces of the cones are provided with longitudinal ribs 25a and 27a to facilitate the non-slipping engagement therewith of the coupling belt 28 which, as shown in Figures 1 and 2 encircles the spaced cones. This belt is adapted to be shifted on the cones whereby to increase or decrease the rotation ratio thereof.

To facilitate the shifting of the coupling belt 28 the following structure is employed.

Disposed between the beams 12 midway between the shafts 18 and 22 is a fixed guide channel 29 which may be in the form of a U beam having the side flanges 30 and the connecting bottom web portions 31. The ends of this guide channel are firmly secured to the beams 12 with the open side of the channel directed upwardly toward the power or drive cone 25. This channel 29 constitutes what may be termed the chain guide channel for supporting the ends of a chain 32 which are connected to the opposite ends of a runner block 33 which lies in the channel 29. As shown in Figure 4 this runner block has end ears 34 to facilitate the attachment of the ends of the chain thereto.

Also suspended transversely of the frame between the beams 12 and secured at its ends to such beams, is a plate 35 which is parallel with and spaced from the underside or web 31 of the chain guide channel 29.

At each end of the plate 35 the beam 12 has therein an opening 36 in which is rotatably mounted upon a suitable pivot 37, a sprocket gear wheel 38. As shown in Figure 1 the chain 32 passes around the wheels 38 so that the lower run of the chain rests on the plate 35 and is supported thereby while the upper run which includes the ends attached to the block 33, slides in the chain guide channel 29 with the block 33 when rotary motion is applied to one of the wheels 38.

As shown in Figure 3 the rotary pivot support for one of the gear wheels 38 may be extended laterally to receive on its outer end a worm gear 39.

Supported on the beam 12 adjacent to the gear 39, in any suitable manner as, for example, by means of the bracket 40, is an electric motor 41, the shaft 42 of which carries a worm 43 which is in mesh with the gear 39. This motor is of the reversible type so that when it is energized for rotation in one direction it will effect the sliding movement, through the chain 32, of the runner block 33 toward one beam 12 and when the motor is reversed it will effect the sliding movement of the runner block in the opposite or reverse direction, for the purpose about to be described.

Disposed transversely across the top of the chain guide channel 29 is a belt shifting beam which is generally designated 44. While this beam may be of any suitable character or form it is here shown as being in the shape of a channel beam or channel iron with the channel directed upwardly so that the base or web portion 45 rests upon the top edges of the flanges 30 of the chain guide channel 29 and the flanges 46 are directed upwardly as shown in Figure 4.

As also shown in Figure 4, the underside or web 45 of the shift beam 44 carries a depending yoke 47 which encloses or encircles the chain guide channel 29 so that the shifting beam can be moved lengthwise of the chain guide channel 29 without moving laterally of this channel. Thus the two channel members 29 and 44 are maintained at all times in right angular relation.

The runner block 33 which is attached to the ends of the chain 32, lies beneath the belt shifting beam 44 and is welded or otherwise secured thereto as indicated at 48 whereby upon moving of the chain by the motor it will be seen that the beam 44 will be shifted on the beam 49.

The cone pulleys 25 and 27 are connected for driving connection by the belt 28 as illustrated and previously described and the shifting of the belt is effected by the shifting beam 44 through the medium of the connections between it and the belt, about to be described.

At each end of the shifting beam 44 the web portion thereof is cut away a substantial distance inwardly from the end of the beam as indicated at 49 to receive the adjacent side of the belt 28 as shown in Figure 2. Also the flange 46 on one side of the beam 44 is cut away or removed back to the edge of the web 45 and is replaced by an extension plate 50 which, as shown in Figure 5, is provided with a longitudinal slot 51 in which are engaged a pair or more of bolts 52 which are carried by the adjacent flange 46. The slot 51 is of sufficient length to permit the extension plate to slide lengthwise with respect to the beam 44.

Disposed between the outer end of each extension plate 50 and the end of the opposite adjacent flange 46 is a belt guide channel 53 which is in the form of a channel iron member, having the side flanges 54 and the connecting web 55 between them, the channels of the two guides 53 being directed inwardly and each receiving the adjacent stretch of belt which extends between the two pulley cones.

Disposed across the outer side of each belt guide channel 53 and welded to the web portion 55 thereof is a pivot rod 56.

The outer end of each slotted extension plate or flange extension 50 and the free end of the opposite adjacent flange 46, extend across the belt guide channel which is between them and beyond the back part or web 55 of the channel and the outer end of the flange extension 50 has an aperture 57 therein in which the adjacent end of the pin or rod 56 is positioned for turning movement. The opposite end of the rod or pin 56 is positioned in a slot 58 formed in and extending longitudinally of the end of the flange 46 opposite the extension 50.

Thus it will be seen that each of the belt guide channels is supported at the outer end of the belt shifting beam, for inward and outward movement.

Disposed transversely of each of the belt guide channels 53 and supported between the flanges 54 thereof, are a number of cross pins 59 upon each of which is rotatably supported a sleeve or roller 60. These sleeves or rollers 60 are positioned between the belt and the back or web part 55 of the guide channel as shown in Figure 2 and bear against the outer side of the belt.

Within each end of the belt shifting beam 44 there are mounted the two longitudinally directed bolts 61, the threaded inner ends of which are extended for free longitudinal movement through guide lugs 62 secured to the inner faces of the flanges 46 as shown in Figure 3. On the side of the lug remote from the adjacent guide channel, each bolt has threaded thereon an adjustment nut 63 while the opposite end of the bolt is attached to a pull spring 64 which is in turn attached to the adjacent flange of the adjacent belt guide channel. Thus by adjusting the nuts 63 upon the bolts 61 an inward pull can be applied to the belt guide channels 53 to maintain the rollers 60 in firm engagement with the outer side or face of the belt 28. This pressure of the belt guide channels against the adjacent sides of the belt is, of course, yielding due to the connecting spring 64 between the channels and the side flanges of the shifting beam 44. It will also be seen that due to the pivotal support of the rod or pin 56 the guide channels 53 may oscillate as may be required in the operation of the device.

On the smaller end of the drive cone pulley 25 there is secured one element 65 of a toothed clutch unit which is generally designated 66, the other element of which clutch unit, designated 67, is formed integral with and on one side of a sprocket gear 68. This sprocket gear 68 is carried, with the clutch element 67, upon a sleeve 69 which has formed therein the peripheral shift fork channel 70.

As shown in Figure 6 the sleeve 69 and the attached sprocket gear 68 and clutch element 67, are mounted upon a bearing sleeve 71 so that when the clutch is disengaged these parts will not rotate with the shaft 18.

Upon the larger end of the driven cone 27 is an annular series of clutch teeth 72 which forms one element of a releasable clutch unit which is generally designated 73. The other element of this clutch unit comprises an annular series of similarly formed but reversely pointing teeth 74 which are carried upon the side of an adjacent sprocket gear 75. The sprocket gear 75 is of the same diameter as the larger end of the adjacent cone pulley 27 while the clutch element and sprocket gear 67 and 68 are of approximately the same diameter as the smaller end of the drive cone pulley 25 as shown and these gear wheels 68 and 75 are connected by a sprocket chain 76.

As is clearly shown in Figure 1 the clutch teeth 72 and the teeth 74 are tapered in a direction to facilitate the sliding connection of the teeth 74 with the teeth 72 upon clockwise rotation of the sprocket gear 75. By reason of the taper of these teeth 72 and 74, if the cone pulley 27 should be driven at a greater speed than the sprocket gear 75, the teeth of the clutch unit 73 will automatically disengage.

The larger sprocket gear 75 is carried upon and secured, with the clutch teeth 74, to a sleeve 76 which corresponds to the sleeve 69 and formed in and around this sleeve 76 is a shift fork groove 77. This sleeve 76 is also mounted upon a bearing sleeve 78 surrounding the shaft 22 and is free to slide on the bearing sleeve and to rotate therearound in the same manner as the sleeve 69 is free to slide on and rotate around the bearing sleeve 71. Thus when the sprocket chain coupled gears 68 and 75 are free of connection with the adjacent cone pulleys, the shafts 18 and 22 will rotate freely without turning the sprocket gears and clutch elements.

The clutches are engaged and disengaged by means of the double shift fork which is generally designated 79 and which comprises the two bar sections 80 which are coupled together by the sleeve 81. At the remote ends of the bar portions 80 are the shift forks 82, each of which is engaged in the circumferential groove or channel of the adjacent clutch sleeve, as illustrated.

The coupling sleeve 81 which connects the bar sections 80, has connected therewith the laterally directed arm 83 which extends outwardly beyond the adjacent frame beam 12 and may be supported in a suitable guide as shown.

Loosely connected with the outer end of the arm 83 by the pin and slot coupling 84, is an end of a shift lever 85 which is pivotally supported for rocking movement on the side of the adjacent beam 12, as indicated at 86.

The numeral 87 generally designates a tensioning means for the chain 76. This tensioning means comprises a crank bar 88 having the oppositely directed right angularly extending terminal portions 89 and 90, the terminal portion 89 being rockably supported on the beam 12 which is adjacent to the chain 76, as indicated at 91.

The other terminal portion 90 of the bar 88 is directed across the adjacent run of the chain 76 and carries for free rotation, a roller or pulley 92 which lies upon the adjacent run of the chain as is shown in Figure 1.

In order to maintain the roller 92 in firm connection with the chain, the extension 90 of the bar 88, is connected by the pull spring 93 with the adjacent beam 12 of the frame structure.

As previously stated the bearings 20, carrying the driven shaft 22 are mounted for adjustable movement on the beams 12 relative to the bearing 16 whereby the coupling belt 28, between the cone pulleys, can be maintained at proper tension so as to prevent slipping on the pulleys.

This tension is maintained by means of two springs 94, each of which is connected at one end with the bearing 20 while the other end is connected with an end of adjustment rod 95 which is extended through an adjacent part 96 of the frame and carries upon the end thereof on the side of the frame part 96 remote from the spring 94, the adjustment nut 97. As shown the connection of each spring 94 with a bearing 20 is upon the side of the bearing remote from the bearing 16 so that the constant tendency of the spring 94 is to pull the bearings 20 away from the fixed bearing 16 so that the tension of the belt 28 is maintained at all times and may be increased, if desired, by threading the adjustment nuts 97 up on the bolts 95 to increase the pull upon the springs.

In the operation of the present transmission structure in starting up the belt 28 is shifted over to the low speed position where it connects the small end of the drive cone 25 with the large end of the driven cone 27. The clutch shift lever 85 is then actuated to engage the clutches 66 and 73 so that when the drive shaft 18 is rotated a direct drive will be set up between this shaft and the shaft 22 by means of the sprocket chain 76, the shaft 22 rotating at a low speed with respect to the drive shaft 18. After the inertia of the load on the shaft 22 is overcome the motor 41 may be operated to move the belt toward the large end of the drive cone pulley 25 whereupon the speed of rotation of the driven pulley will be increased with respect to the speed of the drive pulley 25 and as this speed increases the teeth of the clutch 73 will automatically disengage due to the angular disposition of the cone carried teeth 72 with respect to the teeth 74 carried by the sprocket gear 75. The speed ratio between the cones may then be continuously altered as desired.

I claim:

1. A power transmission mechanism comprising a drive cone pulley, a driven cone pulley parallel to and spaced from said drive pulley, said pulleys being disposed with the large end of one opposed to the small end of the other, a belt connecting said pulleys and shiftable to change the rotational ratio between the pulleys, and a shiftable clutch coupling between the members constructed and arranged to automatically disengage from the driven member when said belt is effective to rotate the driven pulley at a greater speed than the drive pulley.

2. A power transmission mechanism comprising a drive cone pulley, a driven cone pulley parallel to and spaced from the drive pulley, said pulleys being arranged with the large end of one opposed to the small end of the other, a belt connecting said pulleys and shiftable to change the rotational ratio between the pulleys, a fixed clutch element on each of two adjacent ends of said pulleys, a freely rotatable clutch element supported for axial movement into and out of coupled connection with each fixed clutch element, a sprocket and chain drive between the freely rotatable clutch elements, and means for axially shifting said freely rotatable elements into and out of connection with the fixed elements.

3. A power transmission mechanism comprising a drive cone pulley, a driven cone pulley parallel to and spaced from the drive pulley, said pulleys being arranged with the large end of one opposed to the small end of the other, a belt connecting said pulleys and shiftable to change the rotational ratio between the pulleys, a fixed clutch element on each of two adjacent ends of said pulleys, a freely rotatable clutch element supported for axial movement into and out of coupled connection with each fixed clutch element, a sprocket and chain drive between the freely rotatable clutch elements, coacting sloping teeth on the fixed and freely rotatable elements at an end of the driven pulley disposed in a direction relative to the direction of rotation of the driven pulley to effect the separation of said teeth when the driven pulley is rotated at a greater speed than the sprocket gear connected with the adjacent freely rotatable clutch element, and means for axially shifting said freely rotatable elements into and out of connection with the fixed elements.

References Cited in the file of this patent

UNITED STATES PATENTS

| Number | Name | Date |
|---|---|---|
| 112,103 | Wilcock | Feb. 21, 1871 |
| 1,075,037 | Jackson | Oct. 7, 1913 |
| 1,200,083 | Conrardy et al. | Oct. 3, 1916 |
| 1,224,420 | Severy et al. | May 1, 1917 |
| 1,347,165 | Jones | July 20, 1920 |
| 2,010,248 | Winkler | Aug. 6, 1935 |
| 2,463,100 | Gredell | Mar. 1, 1949 |
| 2,538,667 | Chamberlain | Jan. 16, 1951 |

FOREIGN PATENTS

| Number | Country | Date |
|---|---|---|
| 318,530 | Germany | Feb. 2, 1920 |